US006957038B1

(12) United States Patent
Gartner et al.

(10) Patent No.: US 6,957,038 B1
(45) Date of Patent: Oct. 18, 2005

(54) SELF-SCORING METHOD AND APPARATUS FOR EARLY SELF-SCREENING OF NEUROLOGICAL DISEASE

(76) Inventors: William Gartner, P.O. Box 1886, Scottsdale, AZ (US) 85252; Steven Feyrer-Melk, 6335 E. Alta Hacienda Dr., Scottsdale, AZ (US) 85251

( * ) Notice: Subject to any disclaimer, the term of this patent is extended or adjusted under 35 U.S.C. 154(b) by 0 days.

(21) Appl. No.: 10/694,664

(22) Filed: Oct. 29, 2003

Related U.S. Application Data (63) Continuation of application No. 10/015,442, filed on Dec. 13, 2001, now abandoned.

(51) Int. Cl.[7] .............................. G09B 3/00; A61B 5/00
(52) U.S. Cl. ...................... 434/354; 434/262; 434/236; 434/346; 434/322; 434/9.1; 600/300; 422/61
(58) Field of Search ................................. 434/322, 346, 434/354, 236; 128/898; 73/23.34; 600/300; 422/61; 424/9.1

(56) References Cited

U.S. PATENT DOCUMENTS

| | | | | |
|---|---|---|---|---|
| 2,977,689 A | * | 4/1961 | Rugland et al. | ............ 434/353 |
| 3,359,656 A | * | 12/1967 | Seekins | ...................... 434/326 |
| 3,570,139 A | | 3/1971 | Ladd et al. | |
| 4,687,203 A | | 8/1987 | Spector | |
| 5,230,629 A | * | 7/1993 | Buschke | ...................... 434/236 |
| 5,380,765 A | | 1/1995 | Hirsch | |
| 5,447,439 A | | 9/1995 | Nathanson | |
| 6,152,887 A | * | 11/2000 | Blume | ......................... 600/573 |
| 6,325,475 B1 | | 12/2001 | Hayes et al. | |
| 6,557,394 B2 | * | 5/2003 | Doty | ......................... 73/23.34 |
| 2002/0139170 A1 | | 10/2002 | Doty | |

FOREIGN PATENT DOCUMENTS

WO      WO89/00398      1/1989

OTHER PUBLICATIONS

Rita Rubin, "Scientists sniff at home Alzheimer's test", May 9, 2001, USAToday.com.*

* cited by examiner

*Primary Examiner*—Derris H. Banks
*Assistant Examiner*—Dmitry Suhol
(74) *Attorney, Agent, or Firm*—Chambliss, Bahner & Stophel, P.C.

(57) ABSTRACT

A self-administered and self-scoring test kit and method for early self-screening of neurological disease, by detection of diminished olfactory function. The test kit is comprised of a plurality of pages; attached to each page (28) via adhesive is a microencapsulated strip (36) that, when scratched, releases a different, distinct odor. The test kit has instructions that provide for self-administration (33) and self-scoring (46) of the test, and identification of a threshold score (48) as a self-screening method for possible neurological disease and need to consult a physician.

13 Claims, 10 Drawing Sheets

SELF-SCORING METHOD AND APPARATUS FOR EARLY SELF-SCREENING OF NEUROLOGICAL DISEASE

CROSS-REFERENCE TO RELATED APPLICATIONS

This application is a continuation of the co-pending patent application entitled Self-Scoring Method and Apparatus for Early Self-Screening of Neurological Disease, which was filed on Dec. 13, 2001, and assigned Ser. No. 10/015,442 now abandoned. The disclosure of the co-pending application is incorporated herein by reference.

FIELD OF THE INVENTION

The present invention relates in general to a screening apparatus and method for evaluating a person's olfactory function and, more particularly, to a self-administered and self-scored apparatus and method for self-screening of human diseases and disorders.

BACKGROUND OF THE INVENTION

Alzheimer's Disease (AD) is a progressive, degenerative disease that affects the brain resulting in impaired thinking, uncharacteristic behavior and memory loss. The disease manifests in the degeneration of nerve cells responsible for memory and thought processes. AD has two physiological hallmarks: (1) bundles of largely insoluble plaques of beta-amyloid that develop in areas of the brain responsible for memory and cognitive functions and (2) neurofibrillary tangles, or abnormal collections of twisted threads inside nerve cells. The ultimate cause of the disease remains unknown. Therefore, the diagnosis of AD can only be completely confirmed by examination of brain tissue following death to determine whether the levels of plaques and tangles in certain brain regions are characteristic of AD. Because there is no cure for AD, early diagnosis of AD is critical for patients in giving them the benefit of drug therapies that may alleviate more moderate, early symptoms of AD and enhance their quality of life. Early diagnosis allows for the most effective treatment, medical and social management, and personal and family planning.

In diagnosing AD, physicians employ a battery of diagnostic tests, including a complete medical history, physical exam, blood and urine analysis, and memory and psychiatric assessment, such as the Wechsler Memory Test and the Mini Mental State Examination. Assessment of olfactory function is employed in diagnosing AD. The patients exhibit signs of olfactory dysfunction even before the patients manifest other symptoms of AD. Differential olfactory performance recognized between healthy and affected patients, along with lack of awareness of olfactory deficit, provide a mechanism for early screening and diagnosis of AD. Studies suggest that assessment of olfactory function is more reliable than standard cognitive capacity tests, and that diminished sense of smell, along with other factors, such as memory loss and genetic factors, provides the best indicator of AD.

Two principal methods are used to clinically evaluate olfactory function. In one method, vials of scented liquids, each with a distinct scent, are used to assess the examinee's sense of smell. A complete test kit requires several vials of liquid. The second method involves test cards with distinct odor strips affixed to each card. Odor is released when scented microcapsules within each strip are ruptured. Rupture is accomplished either by scratching the surface of the strip or by removal of an adhesive securing the strip to the card. Examples of such tests include the 40-item University of Pennsylvania Smell Identification Test (UPSIT) and the 12-item Cross-Cultural Smell Identification Test (CC-SIT).

Both principal methods are designed for general evaluation of olfactory function. The vial test is reused until the scent diminishes. The vial test requires a health care professional, such as a physician or nurse practitioner, to administer and score the test and then read and interpret the results. The test card method may be self-administered, but a healthcare professional must still score the test and then read and interpret the results. Both the vial test and test card methods are designed for and dependent on the active involvement of a healthcare professional to screen and interpret the resulting score for indications of neurological disease.

In the prior art tests, the required involvement of a healthcare professional has a number of disadvantages. The involvement of a healthcare professional significantly increases the cost to an individual desiring screening. Additionally, visits to a healthcare professional require a considerable time commitment. Furthermore, individuals may perceive mandatory professional involvement as an invasion of privacy. Finally, anxiety and trepidation are often associated with visiting a professional to assess neurological disease. Individually or in combination, these factors can easily dissuade a possible sufferer of neurological disease from early screening and diagnosis. As a result, many individuals will deny themselves the benefit of a useful diagnostic tool.

DESCRIPTION OF THE PREFERRED EMBODIMENTS OF THE INVENTION

Figure 1:
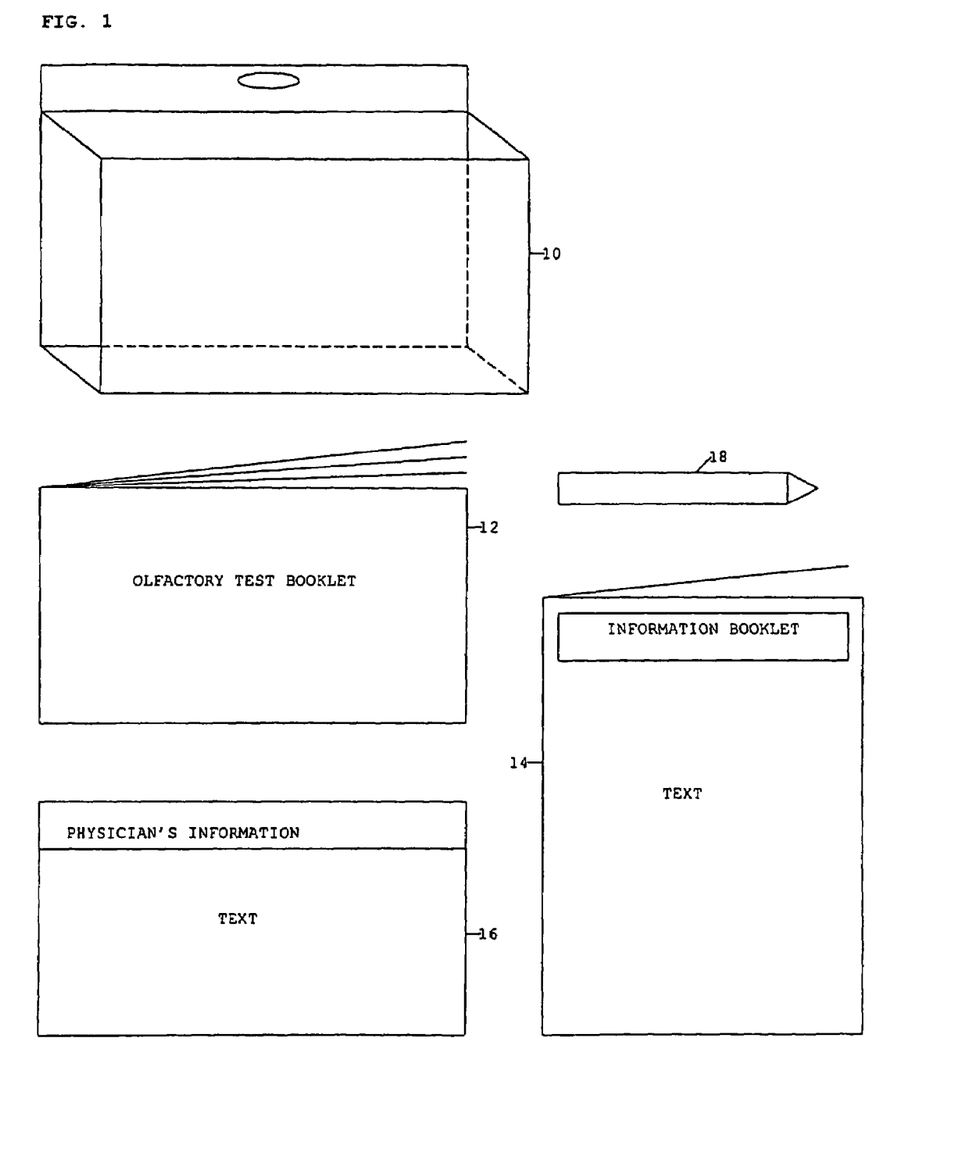
FIG. 1 is the front view of the contents of the self-screening olfactory test kit.

As shown in FIG. 1, a self-screening olfactory test kit includes a test booklet 12, a sharpened pencil an information booklet 14, and a physician's information card 16. The components are packaged in a sealed paper box with an expiration date placed on the box.

Figure 2:
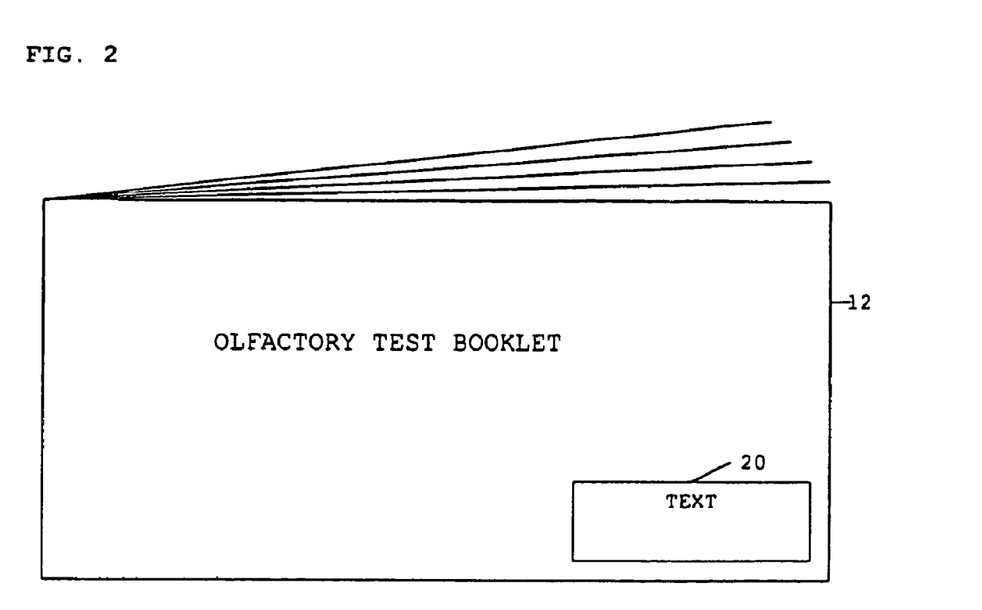
FIG. 2 is the front view of a self-contained, self-administered, and self-scoring olfactory test booklet.
Figure 3A:
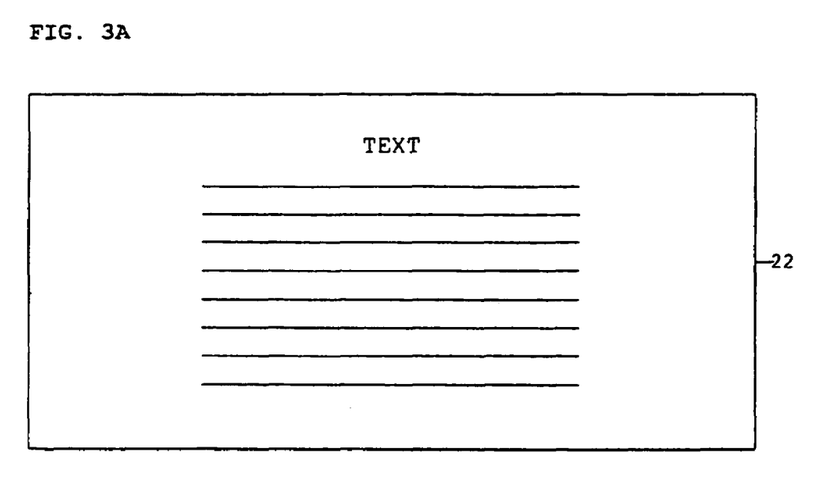
FIG. 3A is the front view of the inside front cover of the olfactory test booklet and FIG. 3B is the front view of the outside back cover of the olfactory test booklet.
Figure 3B:
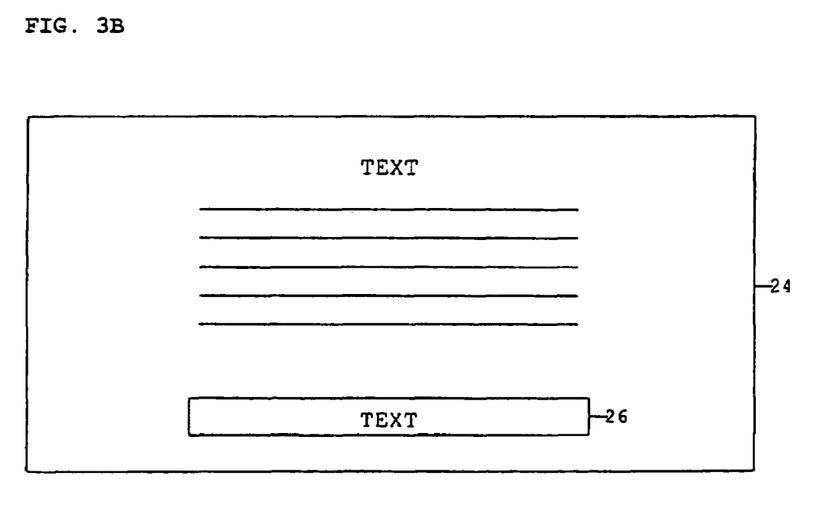
Figure 4:
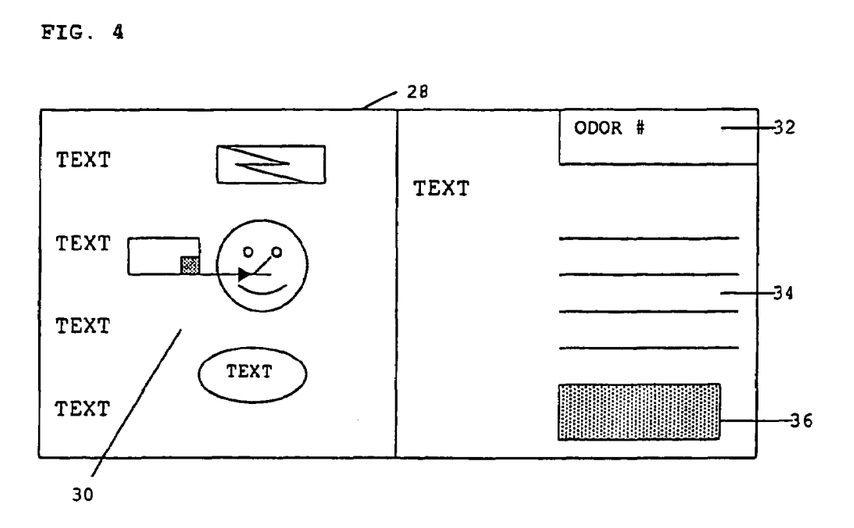
FIG. 4 is the front view of one odor page of a plurality of odor pages contained in the olfactory test booklet.

FIG. 2 shows a self-contained, self-administered, disposable test booklet for detecting decreased olfactory function as an early sign of neurological disease, in particular, Alzheimer's disease. Test booklet 12 comprises a plurality of individual strips of paper each preferably measuring about 32.0 cm in length by about 8.0 cm in width. The strips are folded in half length-wise and are stapled twice in middle of the length, creating pages in booklet form that are 16.0 cm in length by 8.0 cm in width. Test booklet 12 uses seven strips of paper, creating fourteen pages, each with a front side and a back side, when assembled, including twelve inside pages, a front cover and a back cover. The outside of the front cover of test booklet 12 is illustrated in FIG. 2, including a label "Alzheimer's Home Screening Test" written across the center and the text "Important: Information booklet provided. Read the entire booklet prior to beginning this screening test. Follow the instructions carefully." written in lower right corner 20. Inside front cover 22 is illustrated in FIG. 3A. Outside back cover 24 is illustrated in FIG. 3B. Inside back cover 38 is answer key 40 illustrated in FIG. 6A. Each odor page 28 is oriented to a different odor-containing source, odor strip 36, and laid out as shown in FIG. 4. The first eleven odor pages are blank on the back side. Back side of last odor page 44 is illustrated in FIG. 6B. FIG. 3A shows inside front cover 22 of test booklet 12. Bulleted points labeled "important" are written on inside front cover 22. The bulleted points include: (1) smell loss is the among the first signs of Alzheimer's disease; this screening test measures your ability to smell; (2) do not attempt this screening test if you currently have nasal congestion or long-lasting smell loss due to other known causes; (3) do not scratch the odor strip until you are ready to sniff the odor; (4) poor performance on this screening test does not necessarily mean you have Alzheimer's disease; (5) this screening test works only if the directions are followed precisely as noted; (6) this screening test can only be used one time and prior to the expiration date; discard after use; (7) decreased olfactory function (sense of smell) is not the only indicator of Alzheimer's disease; (8) decreased olfactory function (sense of smell) can be found in older individuals without Alzheimer's disease; (9) do not turn to the answer key or look at the answer key until you have completed the test.

FIG. 3B shows outside back cover 24 of test booklet 12. Bulleted points labeled "test booklet storage and handling" are written on outside back cover 24. The bulleted points include: (1) store this screening test kit in a dry place below 86° F. (30° C.); do not refrigerate; (2) do not scratch microencapsulated odor strips until ready to use; (3) sniff microencapsulated odor strips immediately after scratching; (4) do not contact microencapsulated odor strips with any liquid; (5) do not reuse microencapsulated odor strips; discard test after use; (6) this screening test can only be used one time and prior to the expiration date. Phrase 26 "single use only—discard after use" is written below the bullet points.

FIG. 4 shows one odor page 28 of a plurality of pages. Test booklet 12 is comprised of twelve odor pages. The back of odor page 28 is blank, except back side of last odor page 44 which is shown in FIG. 6B. Each odor page 28 contains the same instructions 30 on the left side of the front of odor page 28 labeled "easy step-by-step instructions." Instructions 30 comprise illustrated step-by-step directions for self-administration of the test. The first instruction is numbered as one and says "use pencil provided, scratch odor strip in a ZIG-ZAG." Immediately under the instruction is an illustration of odor strip 36 with a zig-zag line crossing horizontally from the left to the right, back to the left and then again to the right. The next instruction is numbered as two and says "place odor strip directly under both nostrils and sniff." To the right of instruction number two is an illustration of odor page 28 of test booklet 12 with an arrow pointing from odor strip 36 to the right to an illustration of a front view of a human head, the arrow terminating below the nostrils. The, next instruction is numbered three and says "circle the best answer. You must circle one answer." Immediately under the instruction is the phrase "your choice" with a circle around it. The next instruction, numbered four, says "turn the page," and has no illustration. The next eleven odor pages 28 contain identical instructions 30, in the same orientation.

The right side of the front of odor page 28 has an odor number 32, labeled as "ODOR #," written in the upper right corner. The first odor page is labeled "Odor #1," and each of the next eleven odor pages 28 are labeled with an increasing sequential odor number 32, e.g., "Odor #2," "Odor #3," etc. Below odor number 32, the phrase "this odor smells most like:" is written. Immediately underneath that phrase, in parentheses, is written "circle one."

Below the phrases, odor labels 34 are listed above the odor-containing source, odor strip 36. Odor labels 34 are displayed in a right-justified, vertical list with one odor label per horizontal line. Four possible odor labels 34 are listed as possible identities for each odor strip 36 where one odor label is the correct identity for each odor strip 36. Using four possible odor labels 34 for each odor strip 36 decreases the expected score on the basis of random responding to three, or twenty-five percent. Therefore, this increases the probability that a low score, between four and eight, is due to olfactory dysfunction and not a false-positive result due to malingering. The sets of odor labels 34 as possible identities for each odor strip 36 are: (1) fruit, cinnamon, woody and coconut, where cinnamon is the correct identity; (2) turpentine, soap, dog and black pepper, where turpentine is the correct identity; (3) motor oil, garlic, rose and lemon, where lemon is the correct identity; (4) apple, grass, smoke and grape, where smoke is the correct identity; (5) lemon, strawberry, chocolate and black pepper, where chocolate is the correct identity; (6) mint, rose, lime and fruit where rose is the correct identity; (7) watermelon, peanut, rose and paint thinner, where paint thinner is the correct identity; (8) banana, garlic, cherry and motor oil, where banana is the correct identity; (9) smoke, whiskey, pineapple and onion, where pineapple is the correct identity; (10) rose, lemon, apple and gasoline, where gasoline is the correct identity; (11) soap, black pepper, chocolate and peanut, where soap is the correct identity; (12) chocolate, banana, onion and fruit, where onion is the correct identity.

Odor labels 34 listed above are used because studies indicate that particular scents corresponding to odor labels 34 are universally familiar and recognizable by persons from a variety of cultures. The terms used as odor labels 34 are also selected to maximize recognition across a diverse population. For example, the term "woody" is used instead of "pine" because "woody" is a culture-free response as opposed to "pine." Using cross-culturally recognized odor labels 34 reduces examinee confusion resulting from unfamiliarity with the scent corresponding to each odor label. Therefore, false positive test results detecting examinee confusion due to cultural unfamiliarity with odor labels 34, rather than actual olfactory dysfunction, are reduced. Additionally, odor labels 34 are grouped in a particular manner described above because the scents corresponding to odor labels 34 on each odor page 28 are different and distinct from one another. Providing groupings of odor labels 34 with readily distinguishable scents decreases examinee confusion not due to actual olfactory dysfunction. Gross, rather than small, differences in scent between odor labels 34, decreases the likelihood of false-positive test results due to a confusion between scents. Therefore, the particular selection and grouping of odor labels 34 decreases the occurrence of false-positive test results and increases the reliability of the olfactory test as an indicator of olfactory dysfunction.

In the preferred embodiment, a rectangle with rounded corners, the same dimensions as odor strip 36 (about 4.0 cm. in length by about 1.25 cm in width), illustrating where odor strip 36 should be attached, is printed on the right bottom corner of odor page 28. The printed rectangle allows for consistent uniform attachment of odor strip 36 to odor page 28 during assembly of test booklet 12. Each odor page 28 has a different odor strip 36 attached in the printed rectangle to odor page 28 via adhesive.

Figure 5:
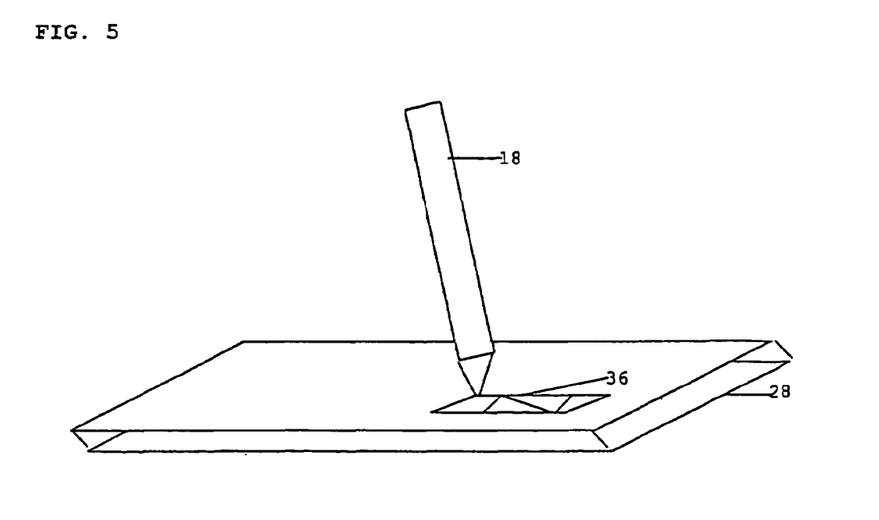
FIG. 5 is a perspective view of one odor page of a plurality of uniform odor pages contained in the test booklet.

FIG. 5 is a three-dimensional view of odor page 28. Odor strip 36 is an odor-containing source. Odor strip 36 contains a plurality of rupturable microcapsules. A distinct scent is located within the microcapsules which is emitted when the microcapsules rupture or burst, as a result of scratching the surface of odor strip 36 with pencil 18. Other objects can be used to scratch the surface of odor strip 36 so as to accomplish rupture. As the microcapsules are ruptured, a burst of fragrance of the distinct scent contained within the microcapsules is given off. Pencil 18 is provided in the test kit for the examinee to use to scratch the surface of odor strip 36 and rupture the microcapsules.

Odor strip 36 is preferably a rectangular strip of paper with rounded corners measuring 4.0 cm in length by 1.25 cm in width. Each odor page 28 contains one odor strip 36 each containing one of the following odors: cinnamon, turpentine, lemon, smoke, chocolate, rose, paint thinner, banana, pineapple, gasoline, soap, and onion. A particular odor strip 36 is chosen from the grouping of odor labels 34 to provide a diverse, cross-cultural olfactory test. Odor strips 36 comprise six food-related odor strips and six nonfood-related odor strips. Odor strips 36 are also chosen based on commercial availability.

Each odor strip 36 has a unique distinguishing visual feature. Each odor strip 36 is a different color. The following color corresponds to each odor strip 36: (1) for cinnamon, brown; (2) for turpentine, light yellow; (3) for lemon, light green; (4) for smoke, peach; (5) for chocolate, light pink; (6) for rose, white; (7) for paint thinner, gray; (8) for banana, dark pink; (9) for pineapple, orange; (10) for gasoline, green; (11) for soap, dark yellow; and (12) for onion, blue. Different colored odor strips are used for post-assembly verification and quality assurance. By color-coding the odor strips, each odor page 28 can be checked to ensure that the correct odor strip 36 was attached to its respective corresponding odor number 32. Other colors can be used to distinguish odor strips 36. Additionally, other coding schemes using distinguishing visual features can be employed.

Figure 6A:
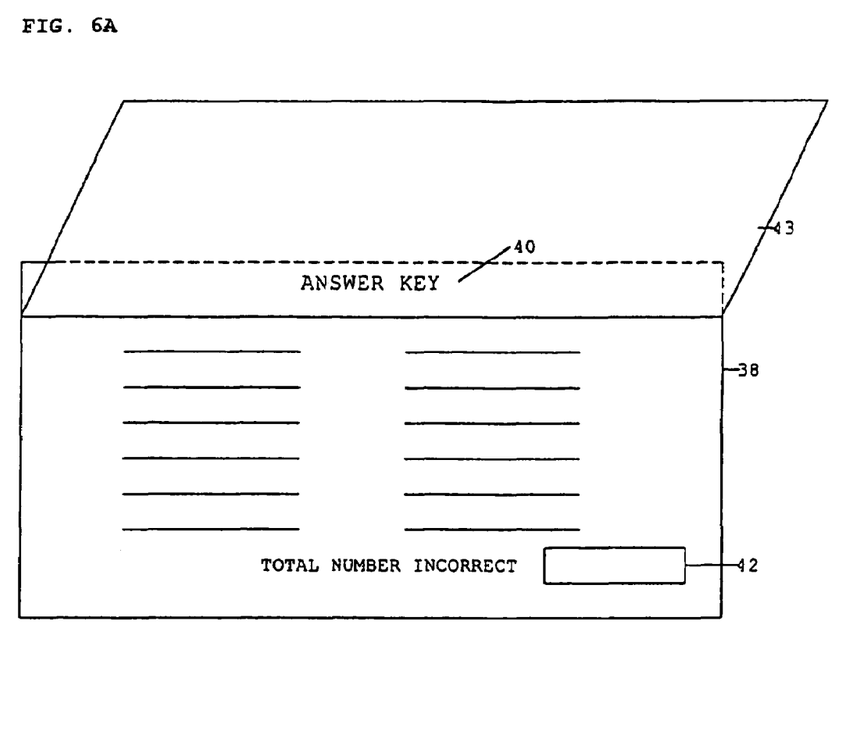
FIGS. 6A, 6B, 6C, and 6D are the front views of the self-scoring and self-screening instructions and mechanism contained in the olfactory test kit.
Figure 6B:
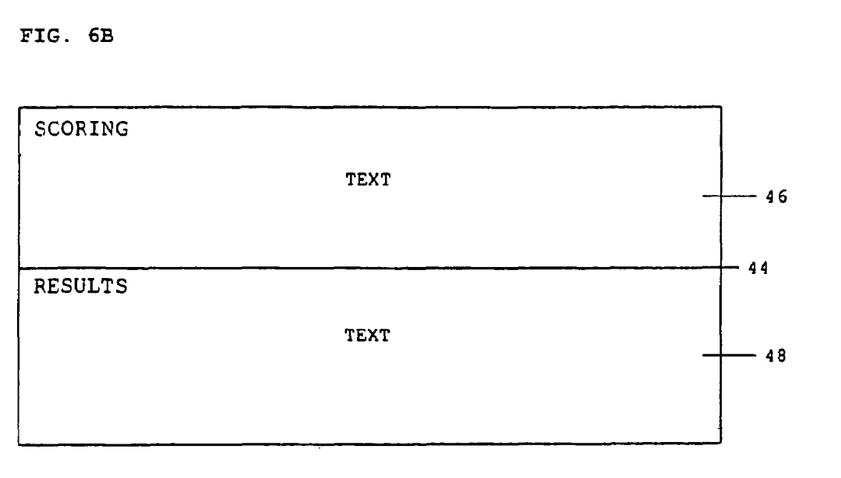

FIG. 6A is inside back cover 38 of test booklet 12 containing answer key 40. Answer key cover 43 is preferably made from paper, about 16.0 cm in length by about 7.0 cm in width attached about 1.0 cm below the top of inside back cover 38 via adhesive. The paper is dense to prevent the text of answer key 40 from being visible through answer key cover 43. The bottom of inside back cover 38 and bottom of answer key cover 43 are attached with a breakable seal. Answer key cover 43 hides answer key 40 from view until the seal is broken and answer key cover 43 is lifted to view answer key 40.

Inside back cover 38 is labeled "answer key." Underneath the label is written "important: do not read this page until you have completed the test." The label and text are located in the top 1.0 cm of inside back cover 38, so as to be visible with answer key cover 43 attached. The odor numbers and the corresponding answers, correctly identifying each odor-containing source, are listed vertically in two columns, six answers per column as follows: in the first, left column: Odor #1=cinnamon; Odor #2=turpentine; Odor #3=lemon; Odor #4=smoke; Odor #5= chocolate; Odor #6 rose; in the second, right column: Odor #7=paint thinner; Odor #8= banana; Odor #9=pineapple; Odor #10=gasoline; Odor #11=soap; and Odor #12=onion. "Total number incorrect" is written on the bottom of FIG. 6A. Blank box 42, preferably about 3.0 cm in length by about 1.0 cm in width, is an area to the right of the phrase for examinee to record the total number of odor-containing sources incorrectly identified.

FIG. 6B illustrates top half 46 of back side of last odor page 44. Top half 46 of FIG. 6B is labeled "scoring the test" and gives instructions for self-scoring the olfactory test from answer key 40. Self-scoring reveals the number of odor-containing sources examinee incorrectly identified. The total number of incorrect identifications is used in self-screening a positive or negative result of the olfactory test. The step-by-step instructions for self-scoring are: (1) after sniffing all 12 odor strips 36 and circling one answer per page, remove answer key cover 43 and look at answer key 40, FIG. 6A, to the right of this page; (2) starting with Odor #1, compare the correct answer found on answer key 40 with the one you circled; if the two do not match, place a line through Odor #1 on answer key 40; (3) a scoring example if answer key and the odor label choice do not match is given in information booklet 14; (4) if you chose correctly and the two match, go to Odor #2; continue until you have viewed and scored each odor for correctness (Odor #1 through Odor #12); (5) after comparing each of your circled answers to answer key 40, total the number of odors you have placed a line through (incorrect answers); and (6) write that number in blank box 42 provided on answer key 40.

FIG. 6B also illustrates bottom half 48 of back side of last odor page 44. Bottom half 48 provides instructions for self-screening to determine a positive or negative result of the olfactory test based on the total number of incorrect answers self-scored from answer 40. Bottom half 48 is labeled "reading the results." Below the label are the self-screening instructions: "after carefully totaling the number of incorrect answers and writing that number in the 'total number incorrect' box, you can read your results. If you have 4 or more incorrect items you should consult your physician. If you do not have 4 or more incorrect items and are experiencing symptoms of Alzheimer's disease (see signs and symptoms of section found in the information booklet), contact your physician. Early Alert is not a diagnostic test nor a conclusive test for Alzheimer's disease. Early Alert has been designed to assist in early detection of possible Alzheimer's disease by testing your sense of smell. Further testing is recommended. Poor performance on this screening test does not necessarily mean you have Alzheimer's disease. See information booklet."

Figure 6C:
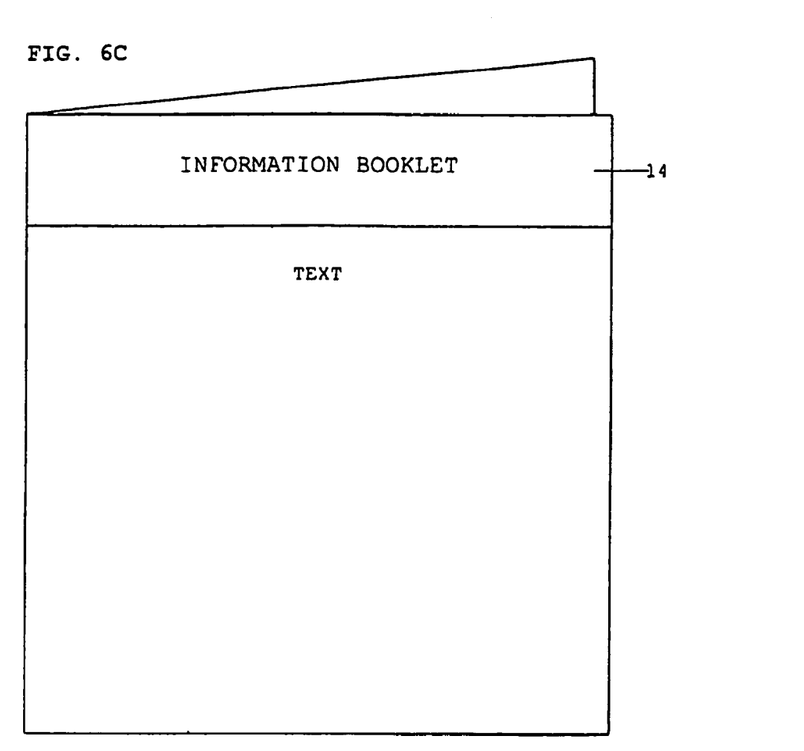

FIG. 6C is information booklet 14. Information booklet 14 preferably comprises one blue sheet of paper about 28.0 cm in length by about 16.75 cm in width. The paper is folded in half lengthwise to create a four page booklet that is preferably about 14.0 cm in length by about 16.75 cm in width. On the first page, information booklet 14 is titled "Information Booklet" and subtitled "Early Alert Home Screening Test for Alzheimer's Disease."

The first page contains an initial instruction under the subtitle to "please read all of the instructions completely before performing the screening test. The directions will help you correctly perform the test and read the results." A telephone help line number and a website address are also listed. Following the initial instruction is text labeled "information about the test." The text states that "smell loss is among the first signs of Alzheimer's disease (AD). The Early Alert Alzheimer's Home Screening Test is a smell test that allows an individual to determine if a loss of olfactory function (the ability to smell) is present. Although not all older persons with smell loss have AD, such loss, alone or in combination with memory problems and/or certain genetic markers, is among the best predictors or indicators of AD. Early Alert has been designed to assist in early detection of possible AD by determining if you have a degraded sense of smell. Failing the test does not necessarily mean you have AD. If you fail the screening test you should consult your physician. If you do not fail the test and are experiencing symptoms of AD (See Signs and Symptoms), consult your physician."

Following the initial instruction are bulleted statements labeled "contents of the home screening test."

The text lists the contents of the test kit as described in FIG. 1. Next, bulleted statements labeled "test booklet storage and handling" follow. The bulleted statements are the same as the bulleted points described on outside back cover 22. Additional bulleted statements labeled "test limitations" subsequently follow. The statements are: (1) the Early Alert screening test works only if the directions are followed precisely as noted; (2) the Early Alert screening test kit can only be used one time and prior to the expiration date; (3) decreased olfactory function (sense of smell) is not the only indicator of potential AD; and (4) decreased olfactory function (sense of smell) can be found in older individuals without AD. Finally, at the bottom of the first page is text labeled "test validity and reliability." The text states that "this test is the most widely employed means of quantitatively assessing the sense of smell. Numerous published scientific and medical studies have employed this exact format and a number have found smell loss to be among the first, if not the first signs of AD. In some cases these studies demonstrated that such loss more or less predicts who, among at-risk individuals, will likely develop AD eventually." The second page, located on the reverse of the first page, is titled "directions" and subtitled "how to take the test." The second page is divided into two sections. The first section is labeled "cautions," and comprises bulleted statements. The statements are: (1) do not attempt the screening test if you currently have nasal congestion or long-lasting smell loss due to other known causes; (2) do not scratch the odor strip until you are ready to sniff the odor; (3) poor performance on the screening test does not necessarily mean you have Alzheimer's disease; (4) read all of the contents of this information booklet before you begin the screening test; (5) do not turn to the answer key or look at the answer key before completing the test.

The second section is labeled "directions" and contains sequentially numbered instructions and illustrations. Instruction number one is "open the screening test booklet to the first page, which is titled Odor #1." The next two instructions are the same as the first two instructions 30 on odor page 28, with the same illustrations.

Instruction number four is "look at the choices provided on the page located above the odor strip, if you are not sure or no smell is present, pick the one that seems closest. Circle the best answer. You must circle one answer." Centered under instruction number four is the phrase "example of answer choice." Centered below the phrase is a vertical list, one choice per horizontal line, of four odor labels: fruit, cinnamon, coconut, and woody. Fruit is circled. Instruction number five is "turn the page of the test booklet to the second page which contains Odor #2. Repeat Step 2 through Step 4 above." Instruction number six is "continue this process until all 12 odor strips have been sniffed and an answer has been circled for each odor." The third page labeled "directions" comprises three sections. The first section is labeled "how to score the test." The text in the first section is the same as top half 46 of back side of last odor page 44. With the text is an illustration of how to self-score each answer. The example shows "Odor #1 Woody" with a line through, i.e. Additionally, an illustration of blank box 42, 1.75 cm in length by 0.4 cm in width, is given to the right of the phrase "total number incorrect."

The second section is labeled "reading the results." The text in the second section is the same text found in bottom half 48 of back side of last odor page 44. The third section is labeled "frequently asked questions." Seven questions, each question labeled on the left with a "Q," are paired with an answer, labeled on the left with an "A." The seven questions and paired answers are: (1) Why do I want to take a home screening test for Alzheimer's? Early diagnosis is very important. Increasing you awareness of possible Alzheimer's disease can help you receive further testing which may lead to potential diagnosis. As a result, you can increase your chance of benefiting from current treatments, improve your quality of life, resolve anxiety, and plan for the future; (2) If I have trouble completing and scoring the test, what should I do? Call the telephone help line number or visit the website address given; (3) What if I have a stuffy nose from a cold and take the test? Taking the test while having nasal congestion is not recommended. Wait until you are healthy and free of symptoms; (4) What should I do if I do not smell anything at all on the odor strip? If you are not sure or no smell is present, pick the one that seems closest; (5) If I have 4 or more odors incorrect do I have Alzheimer's disease? No! Failing this screening test does not mean you have Alzheimer's disease. If you had 4 or more odors incorrect you should consult your physician; (6) If I have less than 4 odors incorrect does that mean I do not have Alzheimer's disease? No, factors other than smell can be used in the Alzheimer's disease diagnosis process. If you have signs or symptoms of consult your physician. (see signs and symptoms); (7) Can I give my test to someone else? No! The test is a single use test.

The fourth page is untitled and contains three sections. The first section is labeled "Alzheimer's Disease—more information." The first section provides general information on Alzheimer's Disease and lists websites with more information on Alzheimer's Disease. The second section is labeled "signs and symptoms." The section begins with "the following information is taken from a widely distributed list of warning signs for Alzheimer's disease." The statement is then followed eight items arranged in a two column vertical unnumbered list, with four items in each column. The items in the first, left column are: (1) misplacing things; (2) word finding problems; (3) poor or decreased judgment; and (4) recent memory loss. The items in the second, right column are: (1) difficulty performing familiar tasks; (2) disorientation to time and place; (3) loss of interest; and (4) changes in mood or behavior. The third section is labeled "medical and scientific references." The third section lists journal articles on Alzheimer's Disease and olfactory dysfunction.

Figure 6D:
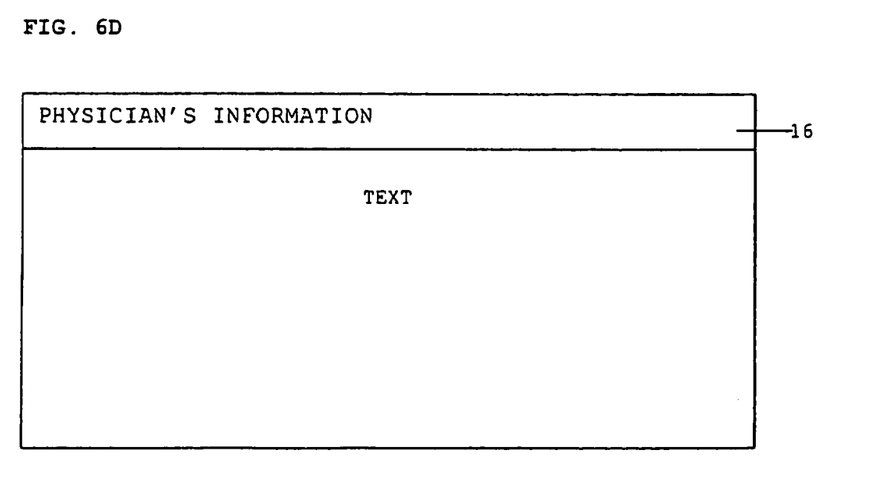

FIG. 6D is physician's information card 16 labeled "physician's information." Physician's information card 16 preferably comprises one sheet of paper, about 17.0 cm in length by about 8.5 cm in width. Physician's information card 16 has text printed on both the front side of the card and the back side of the card. Immediately below the title on the front side of the physician's information card are the statements: "we strongly recommend that you bring this card with you when conferring with your physician. We also suggest that you bring the screening test and information booklet." Physician information card 16 is then formatted as a letter to the physician, beginning, "Dear Physician." The text of the letter explains the olfactory test methodology and indications of a positive result.

Figure 7A:
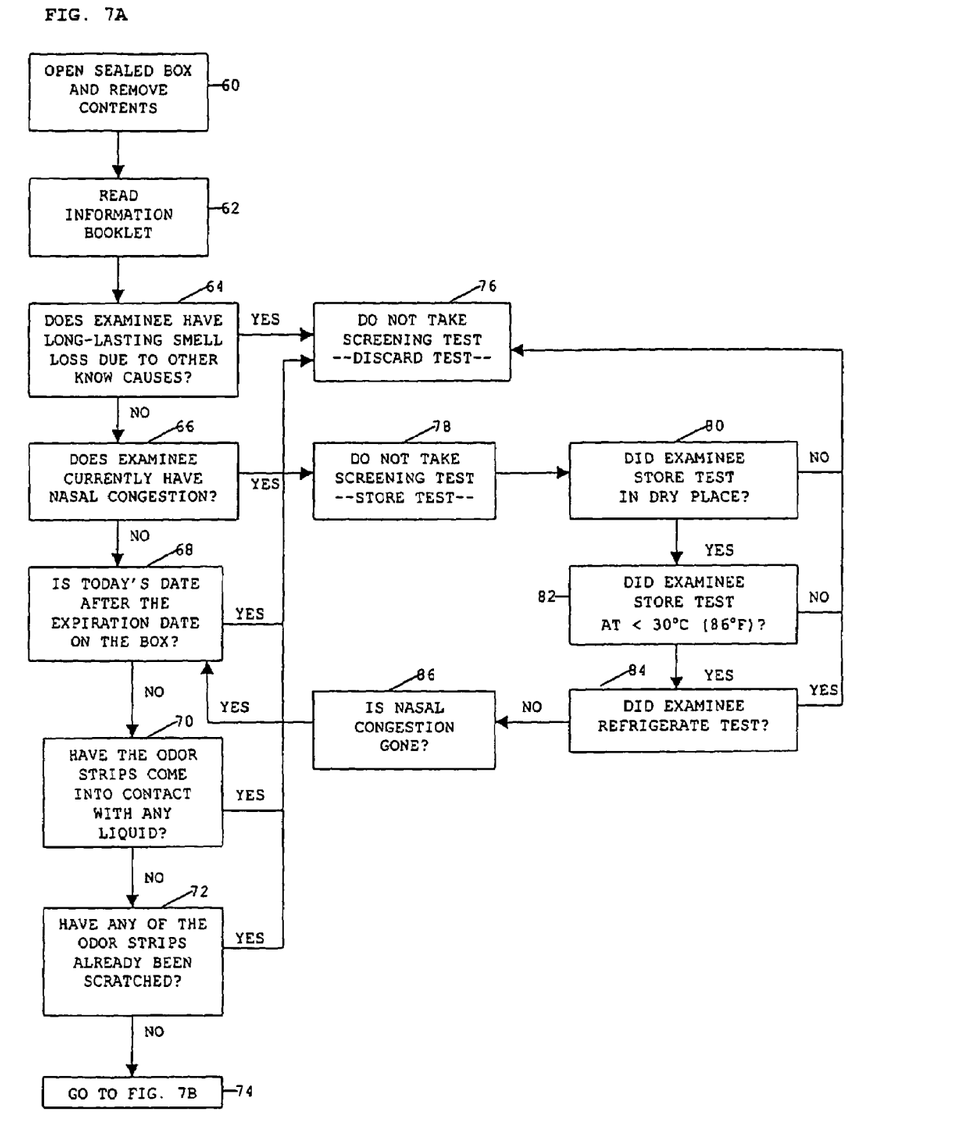
FIGS. 7A, 7B, 7C, and 7D are flowcharts depicting the self-administered, self-scoring and self-screening olfactory test method.

FIG. 7A is a flowchart of the preparation for self-administration the olfactory test. An examinee opens in step 60 the sealed paper box 10 and removes in step 60 the contents: test booklet 12, information booklet 14, physician information card 16, and pencil 18. In step 62, examinee reads information booklet 14.

In step 64, if examinee has long lasting smell loss due to other known causes, examinee is instructed in step 76 not to take the olfactory test. If not, but in step 66 examinee currently has nasal congestion, examinee is instructed in step 78 not to take the olfactory test and, in step 86, to store the test until nasal congestion clears. In steps 80 through 84, examinee stores the test in a dry place at a temperature below 30° C. (86° F.), but does not refrigerate the test. If examinee fails to comply with the storage instructions, then step 76 instructs examinee not to take the olfactory test and to discard the test.

If examinee has no nasal congestion in step 66 or if nasal congestion has cleared in step 86, but the expiration date in step 68 has passed, examinee is instructed in step 76 not to take the olfactory test and to discard the test. If the expiration date in step 68 has not passed, but in step 70 if any odor strip 36 has come into contact with any liquid, or in step 72 if any odor strip 36 has been scratched, step 76 instructs examinee not to take the olfactory test and to discard the test. If not, then in step 74, examinee may begin the olfactory test.

Figure 7B:
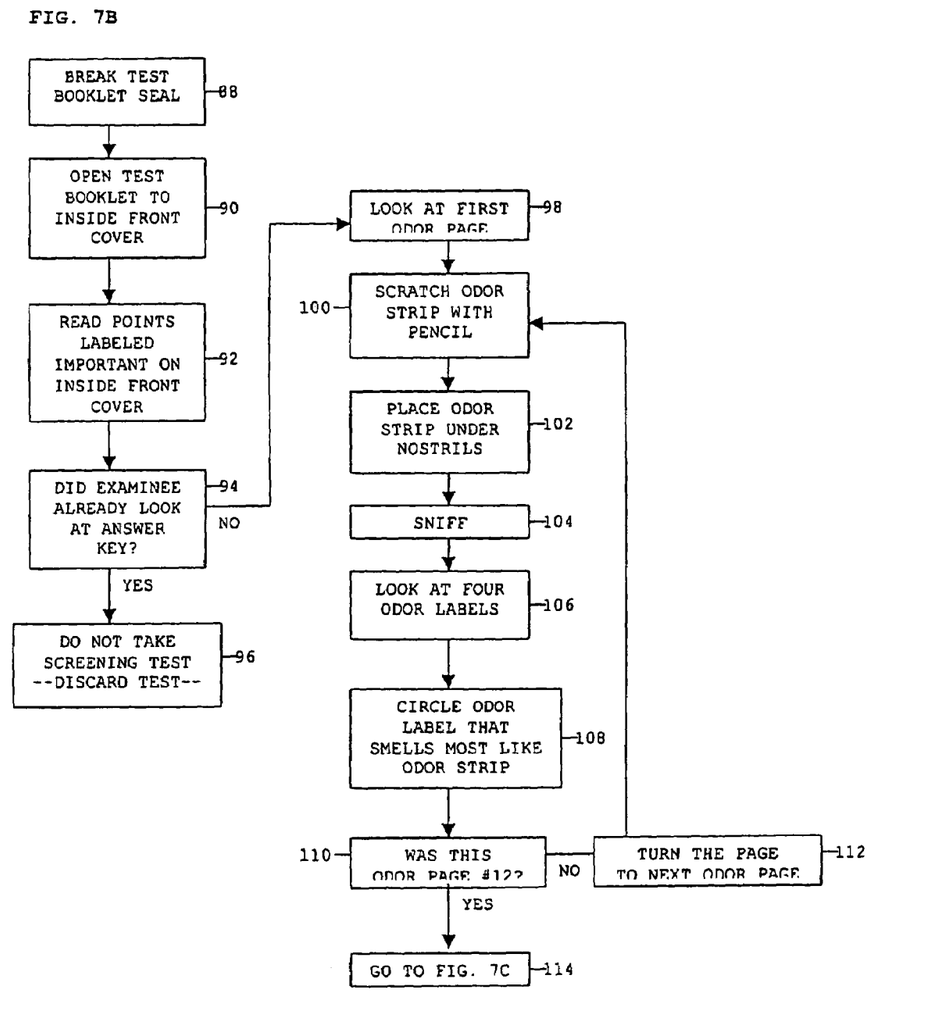

FIG. 7B is a flowchart of the self-administration method of the olfactory test. In step 88, examinee breaks the seal of test booklet 12 and in step 90 opens test booklet 12 to inside front cover 22. In step 92, examinee reads the points labeled "important" on inside front cover 22. If examinee has looked at answer key 40 in step 94, then in step 96, examinee is instructed not to take the olfactory test. In step 94, if examinee has not looked at answer key 40, then in step 98, examinee looks at first odor page 28.

In step 100, examinee uses the sharp end of pencil 18 to scratch odor strip 36 several times in a zig-zag fashion, releasing the odor from the odor-containing area. In step 102, examinee places odor strip 36 directly under both nostrils and in step 104, sniffs odor strip 36. In step 106, examinee looks at odor labels 34 and in step 108, uses pencil 18 to circle the odor label that odor strip 36 smells most like. In step 110, if odor page 28 is not odor #12, then in step 112, examinee turns to the next odor page 28 and repeats steps 100 through 110. When in step 110 the odor number is twelve, then examinee begins to score the test in step 114.

Figure 7C:
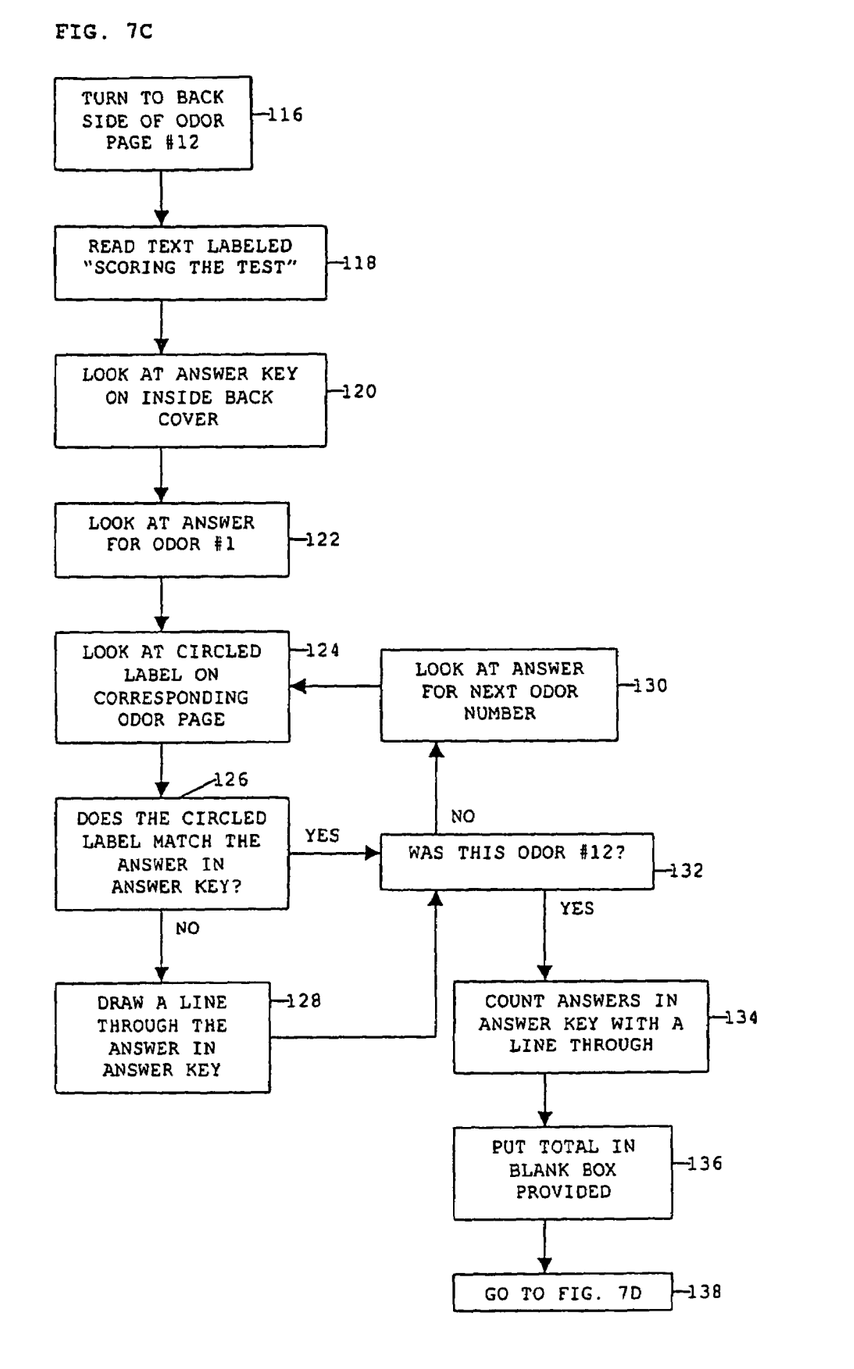

FIG. 7C is a flowchart of the olfactory test's self-scoring method to determine a number of incorrect answers that indicate a positive result. In step 114, after examinee circles an odor label for Odor #12, examinee turns in step 116 to back side of last page 44, and in step 118 reads the "scoring the test" section on top half 46. In step 120, examinee looks at answer key 40 on inside back cover 38. In step 122, examinee looks at the answer for odor #1. In step 124, examinee then looks at the circled odor label for odor #1. In step 126, if the circled label for odor #1 matches the answer for odor #1 in answer key 40, examinee looks at the next odor number and repeats steps 124 through 132. If in step 126, the answer for odor #1 does not match the circled odor label for odor #1, then examinee, in step 128, uses pencil 18 to draw a line through the answer in answer key 40, and then repeats steps 124 through 132.

When in step 132, the odor number is twelve, examinee counts in step 134 the answers in answer key 40 with a line through (the incorrect answers). In step 136, examinee records the total number of incorrect answers in blank box 42 provided next to the phrase "total incorrect number." In step 138, examinee then self-screens the score.

Figure 7D:
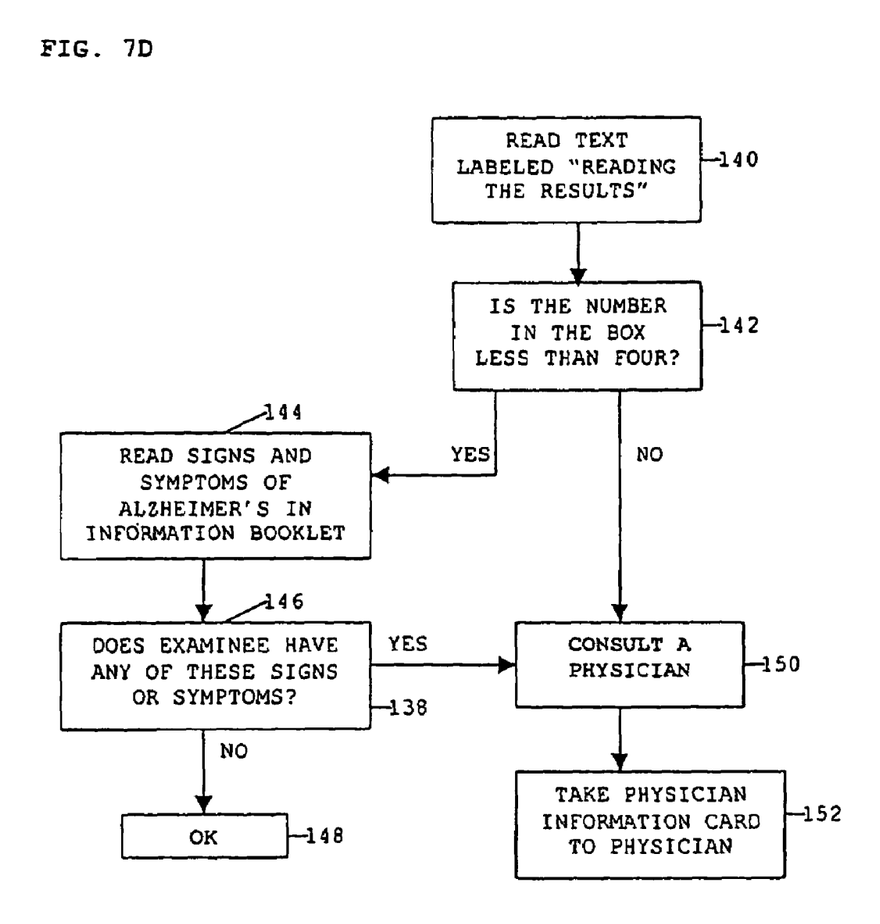

FIG. 7D is a flowchart of the olfactory test's self-screening method to determine a positive or negative result from the total number of incorrect answers self-scored from answer key 40. In step 140, examinee reads bottom half 48 of back side of last odor page 44, "reading the results." If examinee's total incorrect number is four or more, examinee is instructed to consult a physician in step 150. If the examinee needs to consult a physician in step 150, then examinee is further instructed in step 152 to take physician's information card 16 to the physician.

Recording a score of four or more incorrect answers on a twelve odor strip test reveals a statistically significant probability of olfactory dysfunction that is an early detectable symptom of neurological disease, in particular, of Alzheimer's Disease (AD). Studies have shown that incorrectly identifying at least one-third of a total number of odor strips indicates olfactory dysfunction attributable to AD. For example, studies report that one hundred percent of patients diagnosed with AD incorrectly identified one-third or more of a total number of odor strips (in this case, one or more odor strips in a three odor strip test); whereas only twenty percent of patients not currently diagnosed with AD incorrectly identified one out of three odor strips. Additionally, in the same studies, none of the non-AD patients incorrectly identified more than one-third of the odor strips; whereas between seventy-five to ninety-five percent of the AD patients incorrectly identified more than one-third of the odor strips.

In a twelve-item olfactory test, another study reports that ninety-nine percent of individuals age 45 to age 49 recording a score of four of more incorrect answers suffer from olfactory dysfunction. Additionally, at least ninety percent of women and seventy-two percent of men age 65 to age 69 correctly identifying eight or less of the twelve odor strips (scoring four incorrect answers) suffer from olfactory dysfunction.

In step 142, if examinee's total incorrect number is less than four, then examinee is instructed in step 144 to read the section in information booklet 14 labeled "signs and symptoms." In step 146, if examinee is experiencing any of the listed signs or symptoms of Alzheimer's Disease, examinee is instructed in step 150 to consult a physician. If the examinee needs to consult a physician in step 150, then examinee is further instructed in step 152 to take physician's information card 16 to the physician. If examinee's total number incorrect is less than four in step 142 and examinee is not experiencing any listed signs or symptoms of Alzheimer's Disease in step 146, examinee in step 148 needs to take no further action.

The self-screening olfactory test kit eliminates the need for healthcare professional involvement for initial screening of neurological disease. The olfactory test kit requires only a small time commitment since an individual can self-administer and self-score the olfactory test in about five minutes. Additionally, the cost of the olfactory test kit for individual desiring initial screening of neurological disease is minimal compared with an office visit to a healthcare professional.

The olfactory test kit provides individuals with a simple self-screening method to determine a positive result of the olfactory test upon incorrectly identifying one-third or more of the total number of odor-containing areas. A positive result of the olfactory test is an indication of olfactory dysfunction which is not a diagnosis of neurological disease rather an indication that an individual should take further action regarding possible neurological disease, such as consulting a physician. Individuals not only self-administer the olfactory test in a private, in-home setting, but also self-score the olfactory test to determine themselves if the results indicate that further action is required. The olfactory test kit is a quick, inexpensive, private, self-screening, diagnostic tool that does not incur anxiety associated with healthcare professional involvement.

As a result, the olfactory test kit will avail more individuals of the benefits of early screening of possible neurological disease.

Although the present invention has been described with respect to preferred embodiments, any person skilled in the art will recognize that changes may be that changes be made in form and detail, and equivalents may be substituted for elements of the invention without departing from the spirit and scope of the invention. Many modifications may be made to adapt to a particular situation or material to the teaching of the invention without departing from the essential scope of the invention. Therefore, it is intended that the invention not be limited to the particular embodiments disclosed for carrying out this invention, but that the invention will include all embodiments falling within the scope of the appended claims.

What is claimed is:

1. An olfactory test for self-screening neurological diseases, said test comprising a booklet having a plurality of pages, said plurality of pages including:
   (a) a plurality of odor-containing sources, each of the odor-containing sources containing a familiar odor;
   (b) a plurality of labels located adjacent to each of the odor-containing sources and providing choices of possible identity for the adjacent odor-containing source;
   (c) a removably covered answer key which correctly identifies each of the odor-containing sources;
   (d) a first instruction for self-administering the test without assistance from a medical professional;
   (e) a second instruction for self-scoring the test using the answer key to determine an olfactory test result without assistance from a medical professional; and,
   (f) a third instruction for self-interpreting the olfactory test result without assistance from a medical professional;
wherein a first plurality of labels are located adjacent to a first odor-containing source and the first plurality of labels are fruit, cinnamon, woody and coconut; wherein a second plurality of labels are located adjacent to a second odor-containing source and the second plurality of labels are turpentine, soap, dog and black pepper; wherein a third plurality of labels are located adjacent to a third odor-containing source and the third plurality of labels are motor oil, garlic, rose and lemon; wherein a fourth plurality of labels are located adjacent to a fourth odor-containing source and the fourth plurality of labels are apple, grass, smoke and grape; wherein a fifth plurality of labels are located adjacent to a fifth odor-containing source and the fifth plurality of labels are lemon, strawberry, chocolate and black pepper; wherein a sixth plurality of labels are located adjacent to a sixth odor-containing source and the sixth plurality of labels are mint, rose, lime and fruit; wherein a seventh plurality of labels are located adjacent to a seventh odor-containing source and the seventh plurality of labels are watermelon, peanut, rose and paint thinner; wherein an eighth plurality of labels are located adjacent to an eighth odor-containing source and the eighth plurality of labels are banana, garlic, cherry and motor oil; wherein a ninth plurality of labels are located adjacent to a ninth odor-containing source and the ninth plurality of labels are smoke, whiskey, pineapple and onion; wherein a tenth plurality of labels are located adjacent to a tenth odor-containing source and the tenth plurality of labels are rose, lemon, apple and gasoline; wherein an eleventh plurality of labels are located adjacent to an eleventh odor-containing source and the eleventh plurality of labels are soap, black pepper, chocolate and peanut; and wherein a twelfth plurality of labels are located adjacent to a twelfth odor-containing source and the twelfth plurality of labels are chocolate, banana, onion and fruit.

2. The olfactory test of claim 1 wherein the third instruction instructs a user to take further action in the event of a positive olfactory test result.

3. The olfactory test of claim 1 wherein the second instruction instructs a user to:
   (a) compare a selected label for each odor-containing source from the plurality of labels provided for such source to the answer key;
   (b) indicate an incorrect answer; and,
   (c) ascertain a total number of incorrect answers.

4. The olfactory test of claim 1 wherein the answer key is removably covered by a sealed cover sheet.

5. The olfactory test of claim 1 wherein the first odor-containing source is cinnamon; wherein the second odor-containing source is turpentine; wherein the third odor-containing source is lemon; wherein the fourth odor-containing source is smoke; wherein the fifth odor-containing source is chocolate; wherein the sixth odor-containing source is rose; wherein the seventh odor-containing source is paint thinner; wherein the eighth odor-containing source is banana; wherein the ninth odor-containing source is pineapple; wherein the tenth odor-containing source is gasoline; wherein the eleventh odor-containing source is soap; and wherein the twelfth odor-containing source is onion.

6. The olfactory test of claim 1 wherein each of the odor-containing sources has a unique distinguishing visual feature.

7. The olfactory test of claim 1 wherein the neurological diseases include Alzheimer's Disease.

8. The olfactory test of claim 1 further including a first sheet with an instruction about the olfactory test for a medical professional.

9. The olfactory test of claim 1 further including an instrument for releasing the familiar odor from the plurality of odor-containing sources and recording the possible identity of the odor-containing sources.

10. A method for self-screening neurological diseases, said method comprising:
    (a) providing a booklet having a plurality of pages, said plurality of pages including:
        (i) a plurality of odor-containing sources, each of said odor-containing sources containing a familiar odor;
        (ii) a plurality of labels located adjacent to each of the plurality of odor-containing sources and providing choices of possible identity for each adjacent odor-containing source;
        (iii) a removably covered answer key which correctly identifies each of the odor-containing sources; and
        (iv) a first instruction for self-administering the test without assistance from a medical professional;

(v) a second instruction for self-scoring the test using the answer key to determine an olfactory test result without assistance from a medical professional;

(vi) a third instruction for self-interpreting the olfactory test result without assistance from a medical professional;

(b) self-administering the olfactory test without assistance from a medical professional;

(c) self-scoring the olfactory test without assistance from a medical professional; and (d) self-interpreting the olfactory test without assistance from a medical professional, wherein a first plurality of labels are located adjacent to a first odor-containing source and the first plurality of labels are fruit, cinnamon, woody and coconut; wherein a second plurality of labels are located adjacent to a second odor-containing source and the second plurality of labels are turpentine, soap, dog and black pepper; wherein a third plurality of labels are located adjacent to a third odor-containing source and the third plurality of labels are motor oil, garlic, rose and lemon; wherein a fourth plurality of labels are located adjacent to a fourth odor-containing source and the fourth plurality of labels are apple, grass, smoke and grape; wherein a fifth plurality of labels are located adjacent to a fifth odor-containing source and the fifth plurality of labels are lemon, strawberry, chocolate and black pepper; wherein a sixth plurality of labels are located adjacent to a sixth odor-containing source and the sixth plurality of labels are mint, rose, lime and fruit; wherein a seventh plurality of labels are located adjacent to a seventh odor-containing source and the seventh plurality of labels are watermelon, peanut, rose and paint thinner; wherein an eighth plurality of labels are located adjacent to an eighth odor-containing source and the eighth plurality of labels are banana, garlic, cherry and motor oil; wherein a ninth plurality of labels are located adjacent to a ninth odor-containing source and the ninth plurality of labels are smoke, whiskey pineapple and onion; wherein a tenth plurality of labels are located adjacent to a tenth odor-containing source and the tenth plurality of labels are rose, lemon, apple and gasoline; wherein an eleventh plurality of labels are located adjacent to an eleventh odor-containing source and the eleventh plurality of labels are soap, black pepper, chocolate and peanut; and wherein a twelfth plurality of labels are located adjacent to a twelfth odor-containing source and the twelfth plurality of labels are chocolate, banana, onion and fruit.

11. The method of claim 10 which includes instructing a user to take further action in the event of a positive test result.

12. The method of claim 10 which includes providing a first odor-containing source that is cinnamon; providing a second odor-containing source that is turpentine; providing a third odor-containing source that is lemon; providing a fourth odor-containing source that is smoke; providing a fifth odor-containing source that is chocolate; providing a sixth odor-containing source that is rose; providing a seventh odor-containing source that is paint thinner; providing an eighth odor-containing source that is banana; providing a ninth odor-containing source that is pineapple; providing a tenth odor-containing source that is gasoline; providing an eleventh odor-containing source that is soap; and providing a twelfth odor-containing source that is onion.

13. The method of claim 10 wherein the neurological diseases include Alzheimer's Disease.

\* \* \* \* \*